United States Patent
Balasubramanian et al.

(10) Patent No.: US 10,827,033 B1
(45) Date of Patent: Nov. 3, 2020

(54) MOBILE EDGE COMPUTING DEVICE ELIGIBILITY DETERMINATION

(71) Applicant: International Business Machines Corporation, Armonk, NY (US)

(72) Inventors: Swaminathan Balasubramanian, Troy, MI (US); Sarbajit K. Rakshit, Kolkata (IN); Ravi P. Bansal, Tampa, FL (US); Pierre C. Berlandier, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/561,119

(22) Filed: Sep. 5, 2019

(51) Int. Cl.
| | |
|---|---|
| *G06F 15/16* | (2006.01) |
| *H04L 29/08* | (2006.01) |
| *H04W 52/02* | (2009.01) |
| *G06F 9/50* | (2006.01) |

(52) U.S. Cl.
CPC ......... *H04L 67/327* (2013.01); *G06F 9/5027* (2013.01); *G06F 9/5061* (2013.01); *H04L 67/10* (2013.01); *H04L 67/12* (2013.01); *H04L 67/18* (2013.01); *H04W 52/0225* (2013.01)

(58) Field of Classification Search
CPC ......... H04L 67/10; H04L 67/12; H04L 67/18; H04L 67/327; H04W 52/0225; G06F 9/5027; G06F 9/5061
USPC .......................................................... 709/201
See application file for complete search history.

(56) References Cited

U.S. PATENT DOCUMENTS

| | | | |
|---|---|---|---|
| 9,467,839 B1* | 10/2016 | Nishimura | ............... G06F 16/29 |
| 2012/0158991 A1 | 6/2012 | Ajjaguttu et al. | |
| 2019/0020657 A1* | 1/2019 | Egner | ................ G06Q 20/3674 |
| 2019/0158606 A1 | 5/2019 | Guim Bemat et al. | |

FOREIGN PATENT DOCUMENTS

WO   2018/082709 A1   5/2018

OTHER PUBLICATIONS

Xu Chen et al., "Efficient Multi-User Computation Offloading for Mobile-Edge Cloud Computing", IEEE, Oct. 4, 2015, 14 pages.
Jingrong Wang et al., "Learning Based Mobility Management under Uncertainties for Mobile Edge Computing", IEEE Global Communications Conference, 2018, 6 pages.
NGOC-Thanh Dinh et al., "An Efficient Availability Guaranteed Deployment Scheme for IoT Service Chains over Fog-Core Cloud Networks", Sensors (Basel), vol. 18, No. 11, 2018, MDPI, 19 pages.
Albert Jonathan et al., "Ensuring Reliability in Geo-Distributed Edge Cloud", Resilience Week (RWS), 2017, IEEE, 6 pages.

* cited by examiner

*Primary Examiner* — Frantz B Jean
(74) *Attorney, Agent, or Firm* — Maeve M. Carpenter; Maxine L. Barasch; Keohane & D'Alessandro, PLLC

(57) ABSTRACT

Disclosed embodiments provide techniques for determining mobile device edge computing participation eligibility. Multiple mobile devices are identified for potential participation in an edge computing network. An eligibility score is computed for each mobile device of the plurality of mobile devices based on an estimated likelihood that the mobile device will remain within a predetermined distance of a local edge process server of an edge computing network for a duration exceeding a job time. One or more mobile devices are selected for participation in the edge computing network based on their respective eligibility scores.

20 Claims, 11 Drawing Sheets

US 10,827,033 B1

MOBILE EDGE COMPUTING DEVICE ELIGIBILITY DETERMINATION

FIELD

The present invention relates generally to computer networks and, more particularly, to mobile edge computing device eligibility determination.

BACKGROUND

Edge computing brings memory and computing power closer to the location where it is needed. It is a distributed computing paradigm in which computation is largely or completely performed on distributed device nodes. Edge computing pushes applications, data, and computing power away from centralized points to locations closer to the user. Mobile devices such as smartphones and tablet computers can use their own hardware and software as local services for processing the data collected from edge sensors, such as IoT (Internet of Things) sensors. To reduce costs and power requirements, the edge sensors may not have available memory or processing capability to process the data generated by the edge sensors. However, each generation of mobile devices has increased processing power over previous generations, and thus, some mobile devices present in proximity to the edge sensors can participate in processing of the data.

SUMMARY

In one embodiment, there is provided a computer-implemented method for determining mobile device edge computing participation eligibility, comprising: identifying a plurality of mobile devices for potential participation in an edge computing network; computing an eligibility score for each mobile device of the plurality of mobile devices based on an estimated likelihood that the mobile device will remain within a predetermined distance of a local edge process server of an edge computing network for a duration exceeding a job time; and selecting one or more mobile devices of the plurality of mobile devices for participation in the edge computing network based on their respective eligibility scores.

In another embodiment, there is provided an electronic computation device comprising: a processor; a memory coupled to the processor, the memory containing instructions, that when executed by the processor, cause the electronic computation device to: identify a plurality of mobile devices for potential participation in an edge computing network; compute an eligibility score for each mobile device of the plurality of mobile devices based on an estimated likelihood that the mobile device will remain within a predetermined distance of a local edge process server of an edge computing network for a duration exceeding a job time; and select one or more mobile devices of the plurality of mobile devices for participation in the edge computing network based on their respective eligibility scores.

In yet another embodiment, there is provided a computer program product for an electronic computation device comprising a computer readable storage medium having program instructions embodied therewith, the program instructions executable by a processor to cause the electronic computation device to: identify a plurality of mobile devices for potential participation in an edge computing network; compute an eligibility score for each mobile device of the plurality of mobile devices based on an estimated likelihood that the mobile device will remain within a predetermined distance of a local edge process server of an edge computing network for a duration exceeding a job time; and select one or more mobile devices of the plurality of mobile devices for participation in the edge computing network based on their respective eligibility scores.

BRIEF DESCRIPTION OF THE DRAWINGS

Features of the disclosed embodiments will be more readily understood from the following detailed description of the various aspects of the invention taken in conjunction with the accompanying drawings.

Figure 1:
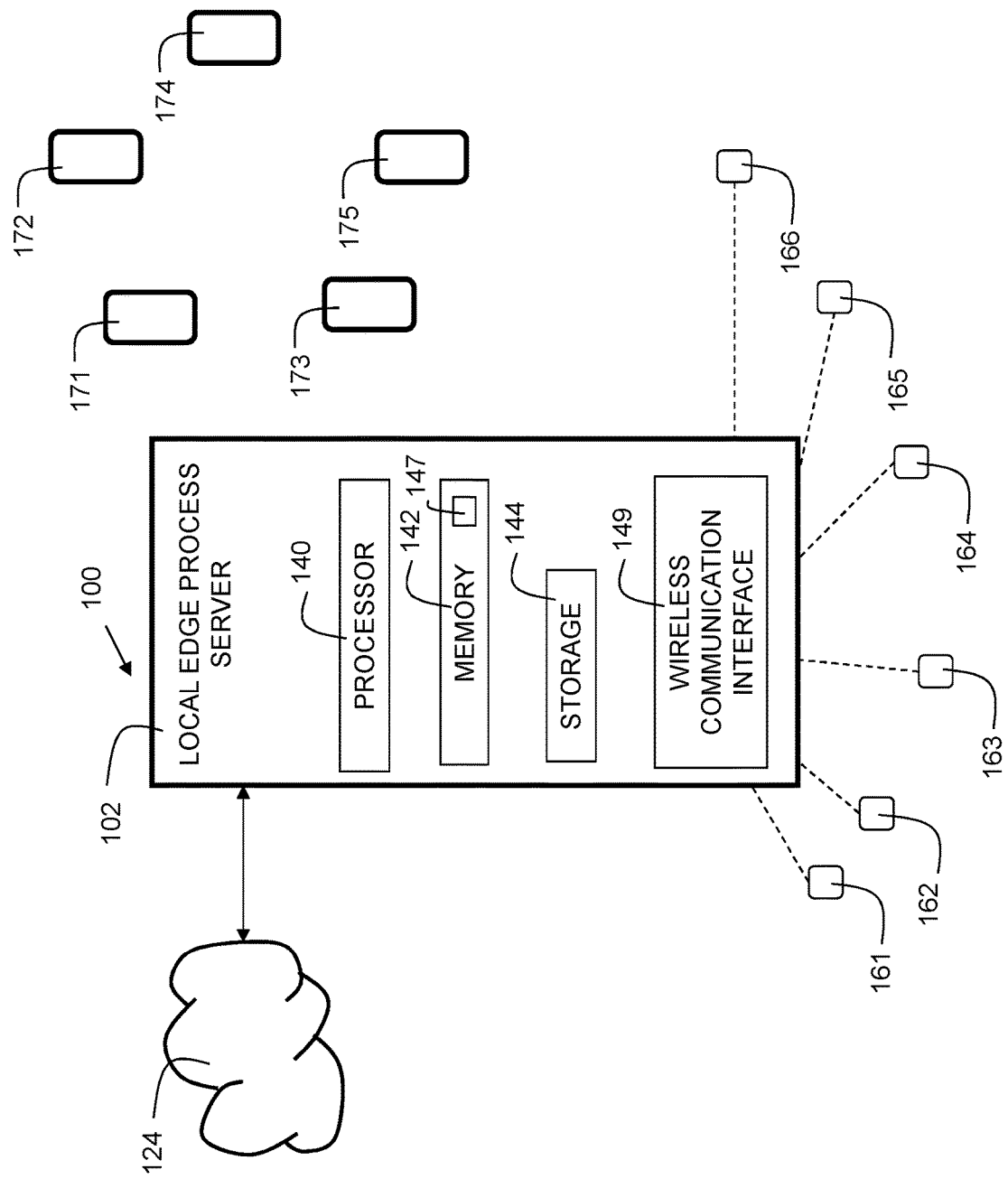
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for determining eligibility of a mobile device to participate in an edge computing network. The advent of low cost, low power consumption, wireless sensors has enabled the Internet of Things (IoT). Protocols such as Bluetooth Low Energy (BLE), Zigbee, and others, have enabled energy efficient transmission of data in a local area via radio. As a result, hundreds, or even thousands, of sensors can be deployed in a relatively small area. A wide variety of sensors and applications are possible. Sensors can include weather data such as temperature, humidity, and precipitation. Such sensors can be used in meteorological applications. The sensors can include vibration sensors, which can be used for detecting vibrations in structures such as buildings and bridges. There are many types of sensors and possible applications. Regardless of the application, very large volumes of data are now being generated by IoT sensors.

To process the large volume of data, it is desirable to distribute the processing task amongst various mobile devices that are in the local area. A local edge process server of an edge computing network is in communication with multiple IoT sensors. The local edge processor then dispatches portions of data to nearby mobile devices for processing. Each portion to be processed is considered as a "job." However, in some instances, the mobile device may leave the vicinity before it can complete its job. This has a computational cost that adversely affects performance, since the local edge processor must then reassign the job to another mobile device and restart the job. Disclosed embodiments compute an eligibility score for each mobile device of the plurality of mobile devices based on an estimated likelihood that the mobile device will remain within a predetermined distance of a local edge process server of an edge computing network for a duration exceeding a job time. The job time is a minimum length of time that the mobile device needs to stay in the vicinity of the local edge processor in order to complete a job. Disclosed embodiments utilize a variety of techniques to compute the eligibility score. By using the eligibility score as a criterion for selection of a mobile device into the edge computing network, there is an increased likelihood that the mobile device will complete its assigned job. Thus, there is a reduction in the performance penalties associated with mobile devices that do not complete their assigned jobs.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is an environment 100 for embodiments of the present invention. Local edge process server 102 comprises a processor 140, a memory 142 coupled to the processor 140, and storage 144. Local edge process server 102 is an electronic computation device. The memory 142, contains instructions 147, that when executed by the processor 140, perform embodiments of the present invention. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. In some embodiments, storage 144 may include one or more magnetic storage devices such as hard disk drives (HDDs). Storage 144 may additionally include one or more solid state drives (SSDs). Local edge process server 102 is connected to network 124, which can include the Internet, a wide area network, a local area network, or other suitable network.

Local edge process server 102 further comprises wireless communications interface 149. Wireless communications interface 149 can include one or more Wi-Fi interfaces, Bluetooth Low Energy (BLE), Zigbee, and/or any other suitable short-range or near field communication interface. In embodiments, the local edge process server 102 collects data from multiple IoT sensors. In FIG. 1, six IoT sensor devices are shown, indicated as 161-166. In practice, there can be hundreds or even thousands of IoT sensors in periodic communication with the local edge process server 102. The sensor devices 161-166 can generate raw data. For example, IoT temperature sensors can generate ambient temperature readings. Based on the number of IoT sensors, and the amount of data each sensor produces, the amount of data received by the local edge process server 102 can be significant, requiring significant computing resources to process. In disclosed embodiments, the local edge process server (LEPS) 102 communicates with nearby mobile devices, indicated as 171-175, to participate in an edge computing network. The LEPS 102 may assign a device a computational task associated with the IoT sensor data, partition the computational task into one or more jobs, and assign the one or more jobs to one or more nearby mobile devices. The mobile devices can help with the computational task by performing a portion of the needed processing. A simple example of such processing is a scenario where each IoT sensor is providing multiple temperature readings, and it is desired to perform a data smoothing function by averaging subsets of the raw data and sending the subset averages elsewhere for further processing. In this scenario, each mobile device that participates in the edge computing network serves to process raw IoT sensor data. These mobile devices may be smartphones, tablet computers, wearable computing devices, vehicular-based computing devices, and/or other suitable computing devices. In some embodiments, a user associated with a mobile device (e.g., a customer of a wireless provider that provides service to the mobile device) may "opt in" to allow his/her mobile device to participate in the edge computing network. In some embodiments, the "opt in" is a one-time event, which may coincide with installation of an application ("app") on the mobile device.

Each processing job takes a finite time to complete. If a mobile device leaves the area prior to completion of its job, the LEPS 102 may reassign that job to another mobile device, thus requiring starting over with that job, which incurs a performance penalty. In disclosed embodiments of the present invention, the LEPS 102 makes a determination about the eligibility of a mobile device to participate in the edge computing network.

In embodiments, there are two main criteria for determining the eligibility. The first criterion is the probability that the mobile device will remain in the vicinity of the LEPS 102 long enough to complete its job and signal completion to the LEPS 102. A second criterion is the device capability, based on processing power and/or other resources.

The vicinity of the LEPS 102 is defined by the wireless technology used to communicate between the mobile devices (171-175) and the LEPS 102 for a given Quality of Service (QoS). In some embodiments, the LEPS 102 and mobile devices (171-175) communicate with each other via Wi-Fi, and the vicinity may range from 40 meters to 100 meters. In some embodiments, the vicinity may be 80 meters. In this example, a mobile device that is farther away from the LEPS 102 than 80 meters is considered outside the vicinity and thus would not be eligible to participate in the edge computing network. In this case, the device that is outside of the vicinity might still be detectable by the LEPS 102, but is deemed too far away to communicate with the desired QoS.

In embodiments of the present invention, for a mobile device that is in the vicinity, disclosed embodiments compute an eligibility score for each mobile device of the plurality of mobile devices based on an estimated likelihood that the mobile device will remain within a predetermined distance of a local edge process server of an edge computing network for a duration exceeding a job time. The job time is an estimate of how long it will take for the mobile device to complete the job. In some embodiments, this estimate is a function of the number of raw data points to process, among other criteria. The determination of likelihood that the mobile device will remain within a predetermined distance of a local edge process server of an edge computing network for a duration exceeding a job time may be based on a variety of factors. These factors can include, but are not limited to, evaluating a directional vector of the mobile device with respect to the local edge process server. The directional vector is a mathematical representation of speed and direction of the mobile device with respect to the local edge process server.

Another factor that may be considered is a historical factor. In embodiments, the LEPS 102 may maintain a list of detected mobile devices and a corresponding unique identifier, such as a MAC address, device serial number, or other unique alphanumeric identifier associated with the mobile device. The LEPS 102 may compile a history of when that device enters and exits the vicinity.

Another factor that may be considered is analysis of calendar entries stored on, or accessed through the mobile device. As an example, if the calendar entry indicates a meeting at a location within the vicinity for the next hour, then the mobile device may be deemed to be available within the vicinity for the next hour. Conversely, if the calendar entry indicates a meeting starting now at a location outside of the vicinity, then the mobile device may be deemed to be ineligible to participate in the edge computing network. Thus, in embodiments, computing the estimated likelihood that the mobile device will remain within a predetermined distance of a local edge process server of an edge computing network for a duration exceeding a job time is based on one or more calendar entries associated with the mobile device.

Another factor that may be considered is analysis of application activity associated with the mobile device. In embodiments, the application activity can be a on a transportation application such as a taxi and/or ridesharing application (e.g., Uber®, Lyft®, or the like). In some embodiments, when a user hails a ride with a ridesharing or taxi application, the mobile device may be deemed to be ineligible to participate in the edge computing network. In some embodiments, the estimated arrival time of the ride is factored into the eligibility decision. As an example, if an estimated job time is three minutes, and the rideshare application indicates the ride is arriving in eight minutes, then the mobile device may be deemed eligible for participation in the edge computing network, since the user will likely remain in the area until the ride arrives.

Another factor that may be considered is the distance between the LEPS 102 and the mobile device. Mobile devices that are closer to the LEPS 102 may be ranked higher than mobile devices that are further away.

Another factor that may be considered is the received signal strength indication (RSSI) of the mobile device as detected by the LEPS 102. Mobile devices that have a stronger RSSI may be ranked higher than mobile devices that have a lower RSSI.

Another factor that may be considered is a received speech utterance detected by the mobile device, and subsequently reported to the LEPS 102. The LEPS 102 may perform natural language processing on speech utterances to determine if any such utterance indicates an upcoming departure from the vicinity. As an example, if a user utters "I need to leave in two minutes" into or near their mobile device, the mobile device may transmit this utterance to the LEPS 102. The LEPS 102 may perform a context analysis to determine if the utterance is indicative of a departure from the vicinity. In this example, the dwell time (time the mobile device is expected to remain in the vicinity) is two minutes, and if the job time of an assigned job is greater than the determined dwell time, then the mobile device is deemed to be ineligible to participate in the edge computing network. In embodiments, a user associated with the mobile device may opt in to allow utterances to be analyzed in this manner.

Another factor that may be considered is a correlation of a first mobile device to a second mobile device. As an example, by tracking a unique identifier, the LEPS 102 may determine that two mobile devices always enter and leave the vicinity at approximately the same time. In such instances, the mobile devices may be correlated to each other. When the first mobile device and second mobile device are correlated to each other by the LEPS 102, then factors that affect the first mobile device are applied to the second mobile device. Similarly, factors that affect the second mobile device are applied to the first mobile device. As an example, if the first mobile device and second mobile device are correlated to each other, and a user of the first mobile device activates a rideshare application and summons a ride that is arriving in three minutes, then the LEPS 102 sets the dwell time of the first mobile device to three minutes. Since the second mobile device is correlated to the first mobile device, the LEPS 102 also sets the dwell time of the second mobile device to three minutes. Thus, in a case where the job time is five minutes, both the first mobile device and the second mobile device are deemed to be ineligible to participate in the edge computing network for the purposes of performing that job.

Referring again to the second criterion of device capability. In some embodiments, the device capability is considered as a factor in determining eligibility. In embodiments, the LEPS 102 queries metadata from each mobile device regarding its capabilities. The metadata can include, but is not limited to, processor type, processor clock speed, total memory available, free memory available, processor utilization, mobile device model name, mobile device manufacturing date, and/or other suitable criteria.

Figure 2A:
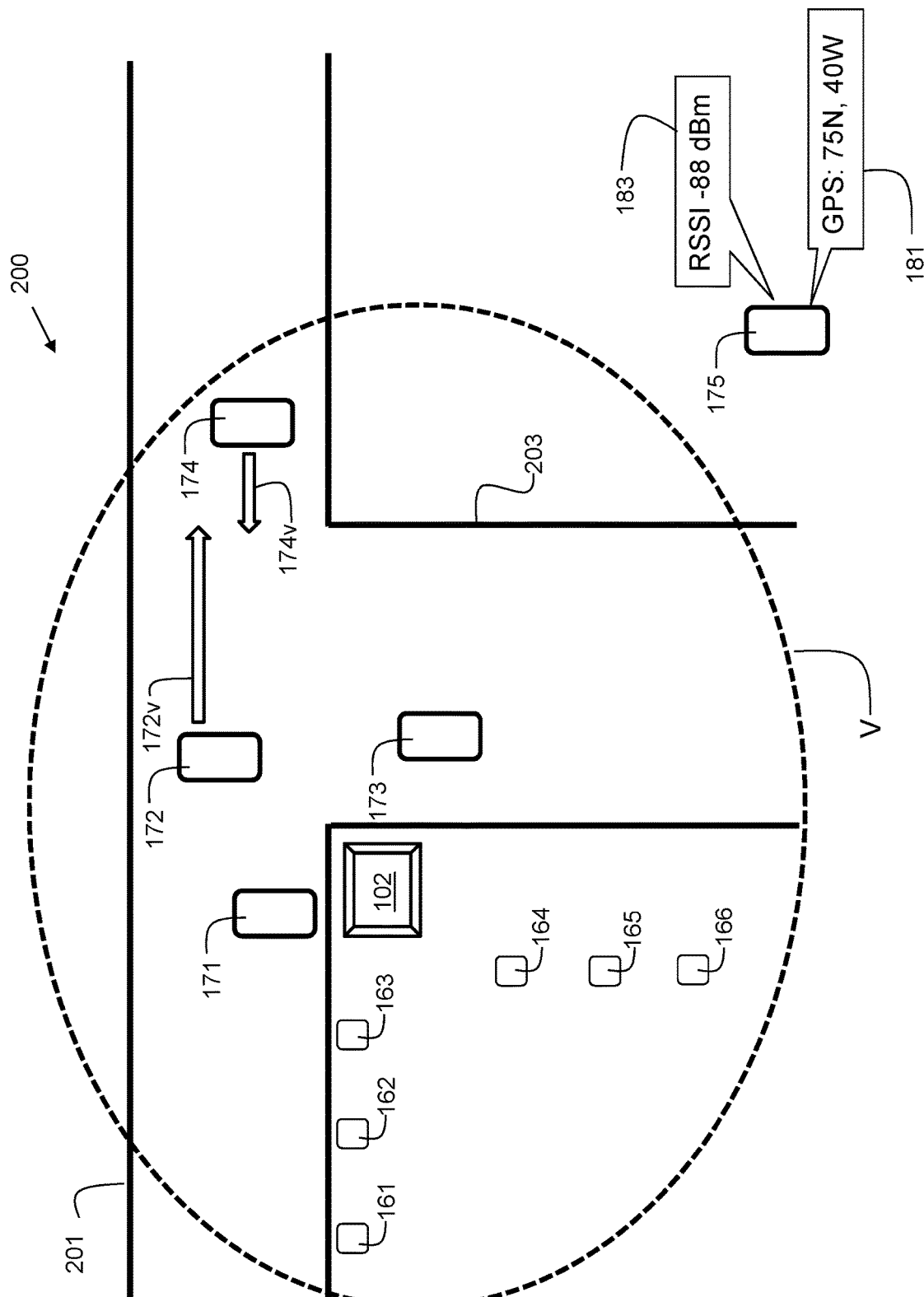
FIGS. 2A-2C illustrate examples of mobile device eligibility determination in accordance with embodiments of the present invention.
Figure 2B:
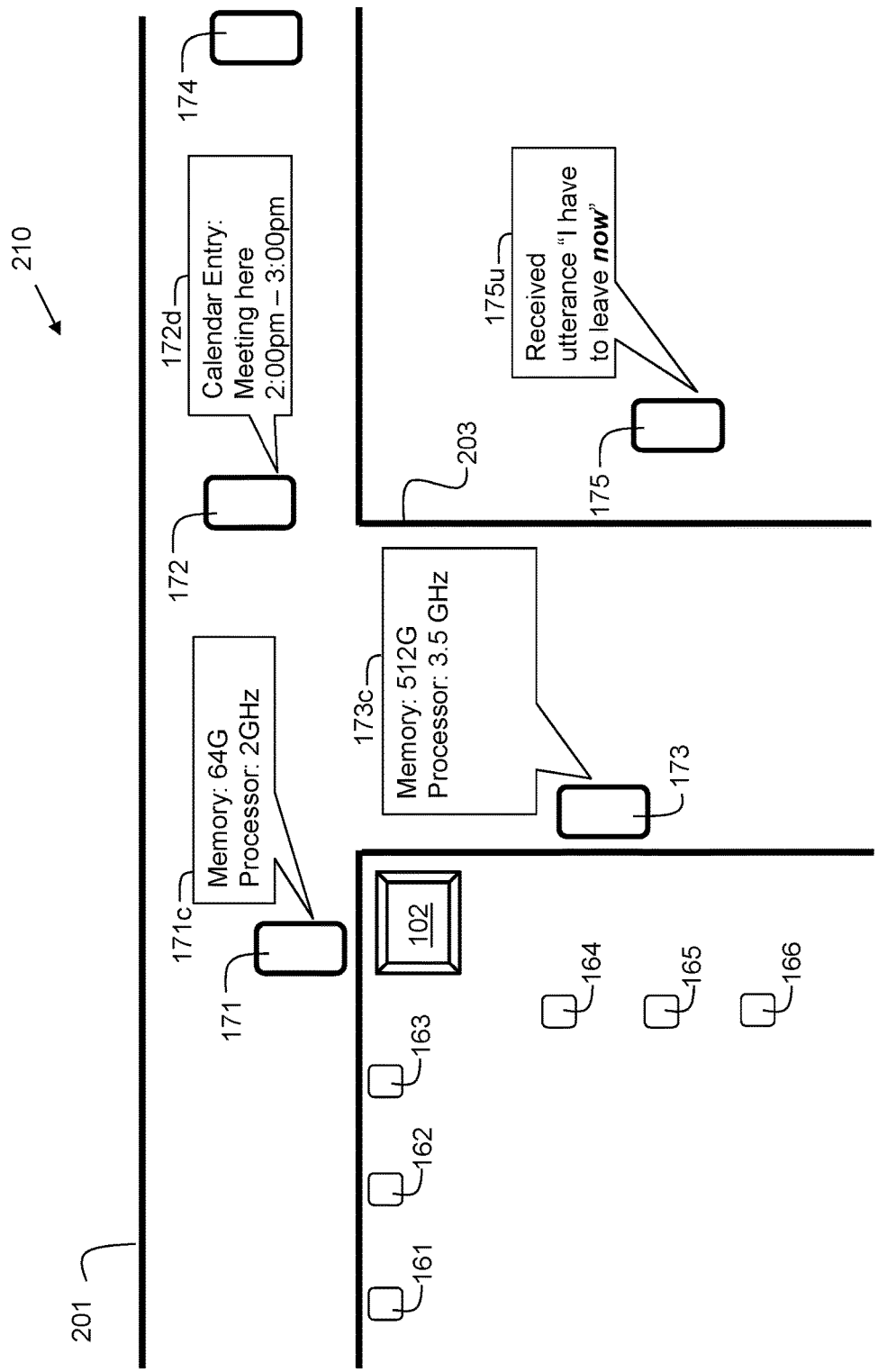
Figure 2C:
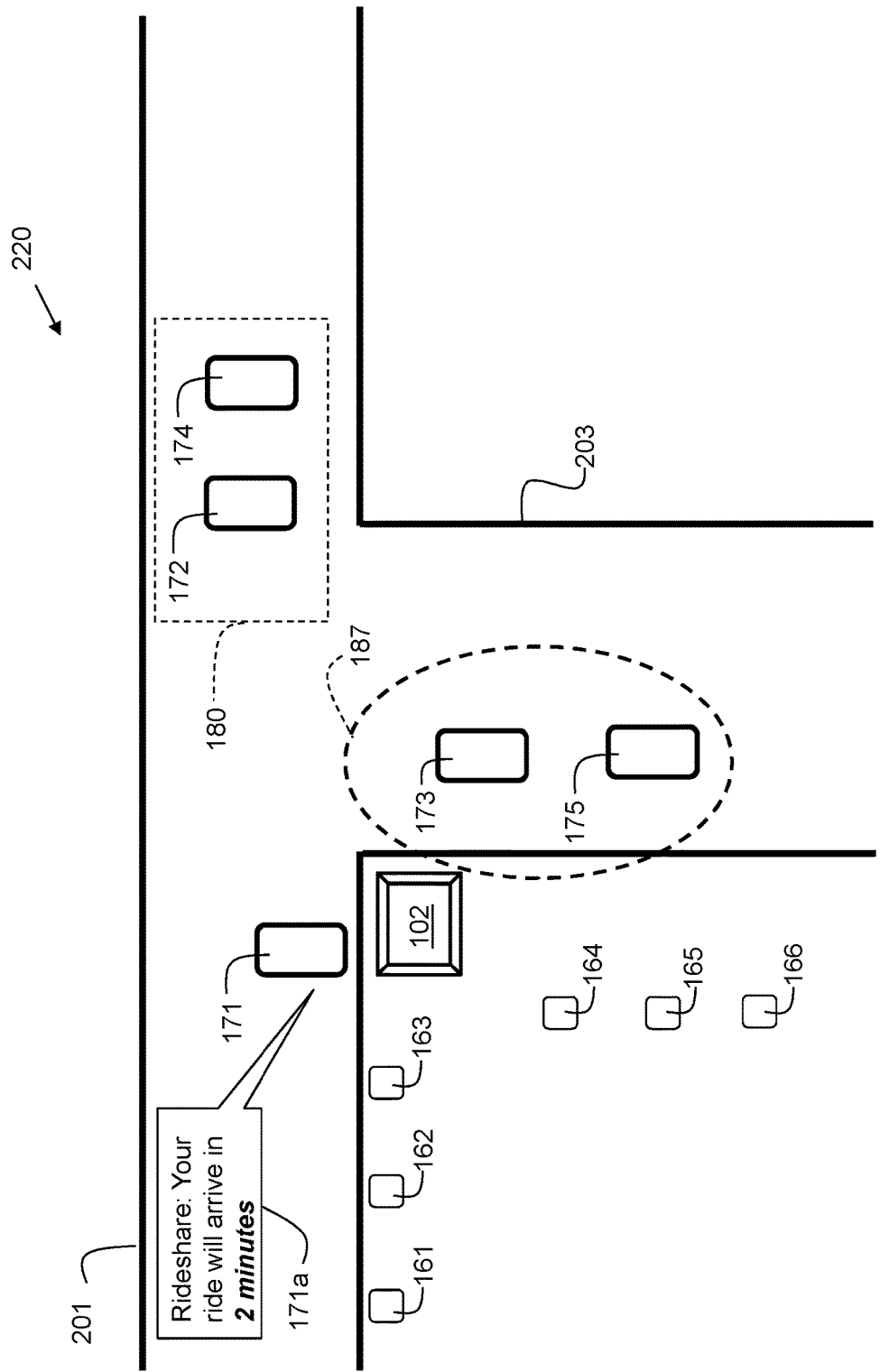

FIGS. 2A-2C illustrate examples of mobile device eligibility determination in accordance with embodiments of the present invention. Referring now to FIG. 2A, example 200 includes a local edge processing server 102 installed at an intersection of two streets. A first street is indicated as 201, and a second street is indicated as 203. In some embodiments, the LEPS 102 may be installed on a utility pole, traffic signal, or other piece of infrastructure equipment. Disposed nearby LEPS 102 are IoT sensor devices 161-166. These IoT sensor devices may communicate with the LEPS 102 via a low power wireless protocol such as Bluetooth Low Energy (BLE). A vicinity V may be established around the LEPS 102. In embodiments, the vicinity V may be a circle with a given radius. In other embodiments, the vicinity V may be defined as an oval, or other shape. For example, due to directionality of radios in the LEPS 102, the reception ability of the LEPS 102 may not be the same in every direction. As shown in FIG. 2A, there are five mobile devices, indicated as 171-175. Mobile devices 171-174 are within the vicinity. Mobile device 175 is outside of the vicinity. In embodiments, the proximity of the mobile device 175 to the LEPS 102 may be obtained by retrieving location coordinates 181 from the mobile device 175 (e.g., via an onboard GPS system). In some embodiments, the proximity of the mobile device 175 to the LEPS 102 may be obtained by triangulation of radio signals (e.g., Wi-Fi signals). In some embodiments, the proximity of the mobile device 175 to the LEPS 102 may be inferred by evaluating the RSSI 183. In some embodiments, if the RSSI is below a predetermined value, then it may be deemed too far away and, hence, ineligible to participate in the edge computing network. Thus, in embodiments, computing the estimated likelihood that the mobile device will remain within a predetermined distance of a local edge process server of an edge computing network for a duration exceeding a job time is based on distance between the mobile device and the local edge process server. In some embodiments, computing the estimated likelihood that the mobile device will remain within a predetermined distance of a local edge process server of an edge computing network for a duration exceeding a job time is based on a received signal strength indication of the mobile device.

In some embodiments, the LEPS 102 may obtain or compute a directional vector of the mobile device with respect to the local edge process server. The directional vector may be obtained through GPS information, radio triangulation, or other suitable method. The directional vector provides an indication of if the mobile device is moving towards or away from the LEPS 102, and how quickly. As an example, mobile device 172 has a directional vector 172*v* indicating that mobile device 172 is moving away from the LEPS 102. Mobile device 174 has a directional vector 174*v* indicating that the mobile device 174 is moving towards the LEPS 102. The length of directional vector 172*v* is longer than that of directional vector 174*v*. This indicates that mobile device 172 is moving away from the LEPS 102 faster than mobile device 174 is moving towards the LEPS 102. From the directional vectors 172*v* and 174*v*, it can be estimated how long the corresponding mobile devices will remain within the vicinity V. Based on the position and directional vector of mobile devices 172 and 174, mobile device 174 is estimated to be within the vicinity V longer than mobile device 172 and, thus, is ranked with a higher eligibility score than mobile device 172. Therefore, it is preferable to assign a job to mobile device 174 over mobile device 172.

Referring now to FIG. 2B, an example 210 in an environment similar to that of FIG. 2A is shown, with examples of information from mobile devices that are used as criteria for computing an eligibility score. Mobile device 171 and mobile device 173 are showing capability data 171*c* and 173*c* respectively, that may be obtained by the LEPS 102. As an example, minimum device requirements may be established for a job. The minimum device requirements can include hardware requirements and/or software requirements. In an example where the minimum device requirements include an onboard memory requirement of 256G or greater, and a processor clock speed of 3 GHz or greater, then mobile device 171 would be deemed ineligible since it has memory and processor clock requirements that are below the minimum device requirements. Conversely, mobile device 173, having an onboard memory of 512G and processor clock speed of 3.5 GHz as indicated in capability data 173*c*, could still be eligible for participation in the edge computing network established by the LEPS 102. Mobile device 175 has received an utterance 175*u*, of "I have to leave now." In embodiments, the LEPS 102 obtains a natural language processing analysis to determine if that phrase indicates a potential departure from the vicinity. In embodiments, the LEPS 102 may perform natural language processing locally. In other embodiments, the LEPS 102 may send raw audio data and/or phoneme data to a remote computer for one or more natural language processing steps such as entity detection, disambiguation, and/or other context analysis. In the example of FIG. 2B, the phrase "leave now" from utterance 175*u* may be used to infer that mobile device 175 will soon be leaving the vicinity and, thus, is deemed ineligible for participation in the edge computing network. Thus, in embodiments, computing the estimated likelihood that the mobile device will remain within a predetermined distance of a local edge process server of an edge computing network for a duration exceeding a job time is based on a speech utterance received by the mobile device.

Referring now to mobile device 172, there is a calendar entry 172*d* indicating a meeting within the vicinity for the time range of 2:00 pm to 3:00 pm. In this example, this information can be used by the LEPS 102 to infer that the mobile device 172 is likely to remain in the vicinity until 3:00 pm. If the calendar entry 172*d* indicated that the meeting location is outside of the vicinity of LEPS 102, then the LEPS could use calendar entry 172*d* to infer that the mobile device 172 is likely to be outside of the vicinity between 2:00 pm and 3:00 pm and deem the mobile device as ineligible as a result.

Referring now to FIG. 2C, an example 220 in an environment similar to that of FIG. 2A is shown, with additional examples of information from mobile devices that are used as criteria for computing an eligibility score. Mobile device 171 is performing application activity 171*a*. In the example shown, application activity 171*a* is rideshare activity. The application activity 171*a* is indicating that a ride will arrive in two minutes. The LEPS 102 may infer that the mobile device 171 will be leaving the vicinity in approximately two minutes, and determine eligibility based on a dwell time of two minutes. If the time required for a job is 30 seconds, the mobile device 171 may be deemed eligible. Conversely, if the time required for a job is six minutes, then the mobile device 171 may be deemed ineligible, since the mobile device 171 is expected to leave the vicinity in two minutes. Mobile device 172 and mobile device 174 are part of a mobile device group 180. Thus, in embodiments, computing the estimated likelihood that the mobile device will remain within a predetermined distance of a local edge process server of an edge computing network for a duration exceeding a job time is based on application activity associated with the mobile device. In particular embodiments, computing the estimated likelihood that the mobile device will remain within a predetermined distance of a local edge process server of an edge computing network for a duration exceeding a job time based on rideshare application activity associated with the mobile device.

In embodiments, the LEPS 102 may group two or more mobile devices into a single mobile device group based on historical behavior, or other association. As an example, a unique identifier may be used to identify each mobile device. When the LEPS 102 detects that the same mobile devices consistently enter and exit the vicinity together, it may form a mobile device group. Once a mobile device group is formed, metadata received from any mobile device that is a member of the mobile device group may be applied as criteria to all the mobile devices within the mobile device group. As an example, if mobile device 172 receives metadata indicating an imminent departure from the vicinity, that metadata makes mobile device 172 ineligible to participate in the edge computing network. Since mobile device 174 is part of the same mobile device group as mobile device 172, the metadata from mobile device 172 also makes mobile device 174 ineligible to participate in the edge computing network. In the example of FIG. 2C, mobile device 173 and mobile device 175 are both selected to perform jobs to process the data from IoT sensor devices 161-166. Thus, mobile device 173 and mobile device 175 form edge computing network 187 that processes data from IoT sensor devices 161-166. As an example, the IoT sensors may produce raw sound level data for an application to monitor noise pollution at a location. The mobile edge devices in edge computing network 187 may perform tasks such as noise filtering, data compression, and/or other tasks. The mobile edge devices in edge computing network 187 may compute intermediate results that may then be returned to the LEPS 102 and/or forwarded to another remote computing device for further processing. Upon completion of their respective jobs, mobile device 173 and mobile device 175 may each send a completion indication message to the LEPS 102. The LEPS 102 then may assign new jobs to one or more of the mobile devices within edge computing network 187. Over time, as mobile devices enter and leave the vicinity, the number of mobile devices participating in the edge computing network 187 can increase or decrease. While two mobile devices are shown in edge computing network 187, in practice, there can be hundreds or even thousands of mobile devices in an edge computing network. In situations such as stadiums, train stations, or other venues with dense crowds, the number of potential mobile devices for participation in an edge computing network can be large. In these situations, this enables the LEPS 102 to potentially take advantage of thousands of available mobile devices for participation in an edge computing network to process IoT sensor data.

Figure 3:
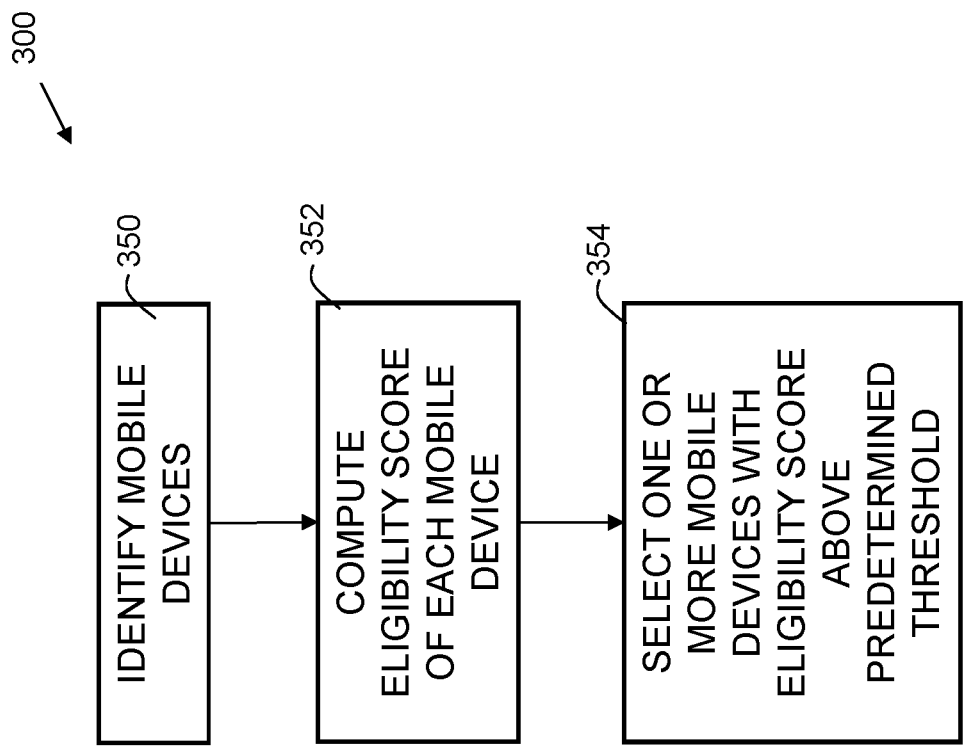
FIG. 3 is a flowchart indicating process steps for embodiments of the present invention.

FIG. 3 is a flowchart 300 indicating process steps for embodiments of the present invention. At 350, mobile devices are identified. In embodiments, this can be performed with beacons, such as Wi-Fi beacons, Bluetooth Low Energy beacons, or other suitable beacon or advertising technique.

At 352, an eligibility score of each mobile device is computed. In some embodiments, the eligibility score E for a mobile device m is computed as:

$$E = \text{Cap}(m)V(m)\text{Dwell}(m)$$

Where Cap(m) is a capability function for device m, V(m) is a vicinity function for device m, and Dwell(m) is a dwell time estimate for device m. In embodiments, Cap(m) is a Boolean function, either returning 0 if the mobile device m does not meet the capabilities for the job, as specified by the LEPS, or returning 1 if the mobile device m does meet the capabilities for the job. Thus, in embodiments, computing an eligibility score for each mobile device of the plurality of mobile devices further includes performing an evaluation of available resources of each mobile device of the plurality of mobile devices.

The V(m) may be a function that returns a value inversely proportional to the distance between the mobile device m and the LEPS. In some embodiments, the V(m) may use a floor function to return 0 if the distance exceeds a predetermined value. When either the Cap(m) or V(m) return 0, the score E evaluates to zero, indicating that a mobile device is ineligible to participate in the edge computing network. Thus, in embodiments, computing the estimated likelihood that the mobile device will remain within a predetermined distance of a local edge process server of an edge computing network for a duration exceeding a job time is based on a directional vector of the mobile device with respect to the local edge process server.

The Dwell(m) function returns a value indicating a likely duration that the mobile device m will remain in the vicinity. A preset probability may be used (e.g., 3 sigma, 80% probability, or other suitable benchmark). Thus, in embodiments, the Dwell(m) function returns a duration (e.g., in seconds) that the mobile device is likely to remain in the vicinity for that preset probability. For example, if the preset probability is 90%, and the duration is 100 seconds, then there is computed a 90% chance that the mobile device m will remain in the vicinity for the next 100 seconds. In some embodiments, the directional vectors (see FIG. 2A) are used to compute an estimated time that the mobile device will remain in the vicinity.

In some embodiments, characteristics of a job j may also be used to determine the eligibility score. Characteristics of a job j, may include, but are not limited to, real-time requirements, bandwidth requirements, memory requirements, tolerance for lossy or incomplete results, and/or number of raw data points in the job input. In such a case, the capability function used in determining the eligibility score E may also be a function of the job characteristics j. In such an embodiment, the eligibility score E may be defined as:

$$E = \text{Cap}(j,m)V(m)\text{Dwell}(m)$$

At 354, one or more mobile devices with an eligibility score above a predetermined threshold are selected for participation in the edge computing network. As an example, if a job requires 150 seconds of mobile device computing time, and there are three jobs available to dispatch, then the LEPS may search for the three mobile devices with the highest eligibility score E that exceeds 150. In some embodiments, other scaling factors and/or constants may be used to fine tune the computation of the eligibility score.

Figure 4:
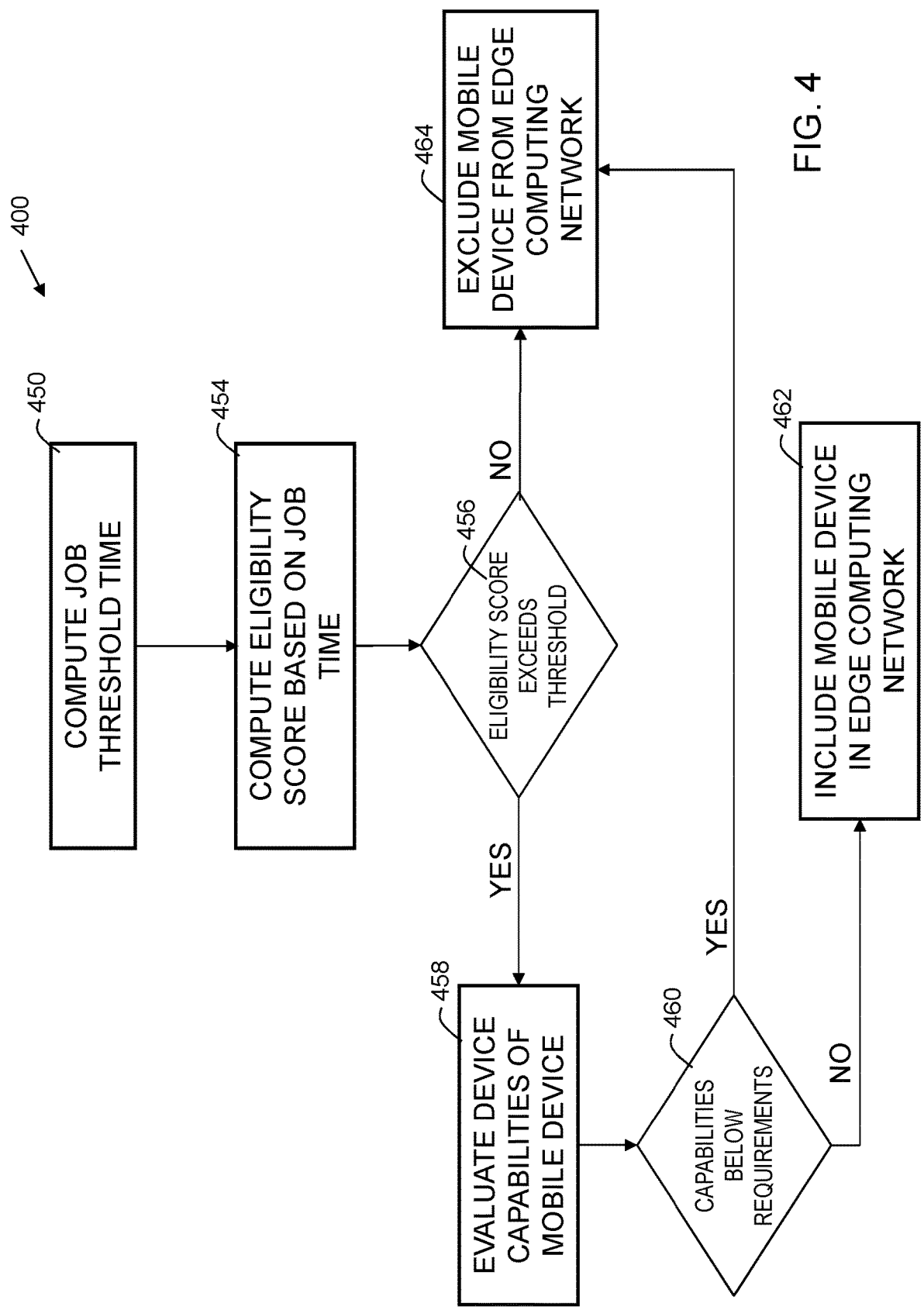
FIG. 4 is a flowchart indicating additional process steps for embodiments of the present invention.

FIG. 4 is a flowchart indicating additional process steps for embodiments of the present invention. At 450, a job threshold time is computed. In embodiments, the LEPS makes this computation based on the amount of data that is to be processed for the job. In some embodiments, the time estimate may be based on empirical information. For example, if it is known that a job performing a filtering algorithm on 500,000 data points requires 250 seconds on a reference mobile computing device, then that information may be used to estimate a job completion time on a different number of data points and/or on a different hardware/software platform. For example, it may then be estimated, based on the empirical information, that performing the filtering algorithm job on 2,000,000 data points would require 1,000 seconds on the reference mobile computing device. The reference mobile computing device can be a known mobile computing device with a given processor type, processor speed, and available memory, and may also include other attributes. If a mobile device that is more capable than the reference mobile device is used, the estimated job completion time may be reduced accordingly. If a mobile device that is less capable than the reference mobile device is used, the estimated job completion time may be increased accordingly. Additionally, a safety margin may be added to the estimated job completion time to create a job threshold time. For example, with a 10 percent safety margin, an estimated job completion time of 1,000 seconds results in a job threshold time of 1,100 seconds.

At 454, an eligibility score is computed based on the job threshold time. The LEPS seeks mobile devices that are likely to remain in the vicinity for a dwell time that exceeds the job threshold time. In the example where the job threshold time is 1,100 seconds, the LEPS is seeking mobile devices that are likely to remain in the vicinity for a time exceeding 1,100 seconds. The eligibility score can be based on directional vectors, historical information, application activity (e.g. rideshare application activity, calendar application activity, text messaging application activity), received utterances, and/or other suitable information.

At 456, a check is made to see if the mobile device is likely to remain in the vicinity for a time that exceeds the job threshold time. If no, then the mobile device is excluded from the edge computing network at 464. If, at 456, the result is yes, the process continues to 458, where the device capabilities of the mobile device are evaluated. The capabilities can include a device model, device manufacturing date, processor type, processor clock speed, total memory, free memory, idle processor time percentage, operating system version, and/or other suitable information.

At 460, the capabilities of the mobile device are compared against baseline device requirements. The baseline device requirements may be established a priori as part of a configuration of the LEPS. In some embodiments, the baseline device requirements are based on the size of the job. For example, a job involving a smaller number of data points to process may have reduced baseline device requirements as compared with a job involving a larger number of data points to process.

If, at 460, the capabilities are below the baseline device requirements, then the mobile device is excluded from the edge computing network at 464. If instead at 460 the capabilities are not below the baseline device requirements, then the mobile device is included in the edge computing network at 462. Note, in some embodiments, some processes shown in flowchart 400 may be performed concurrently, or in a different order.

Figure 5:
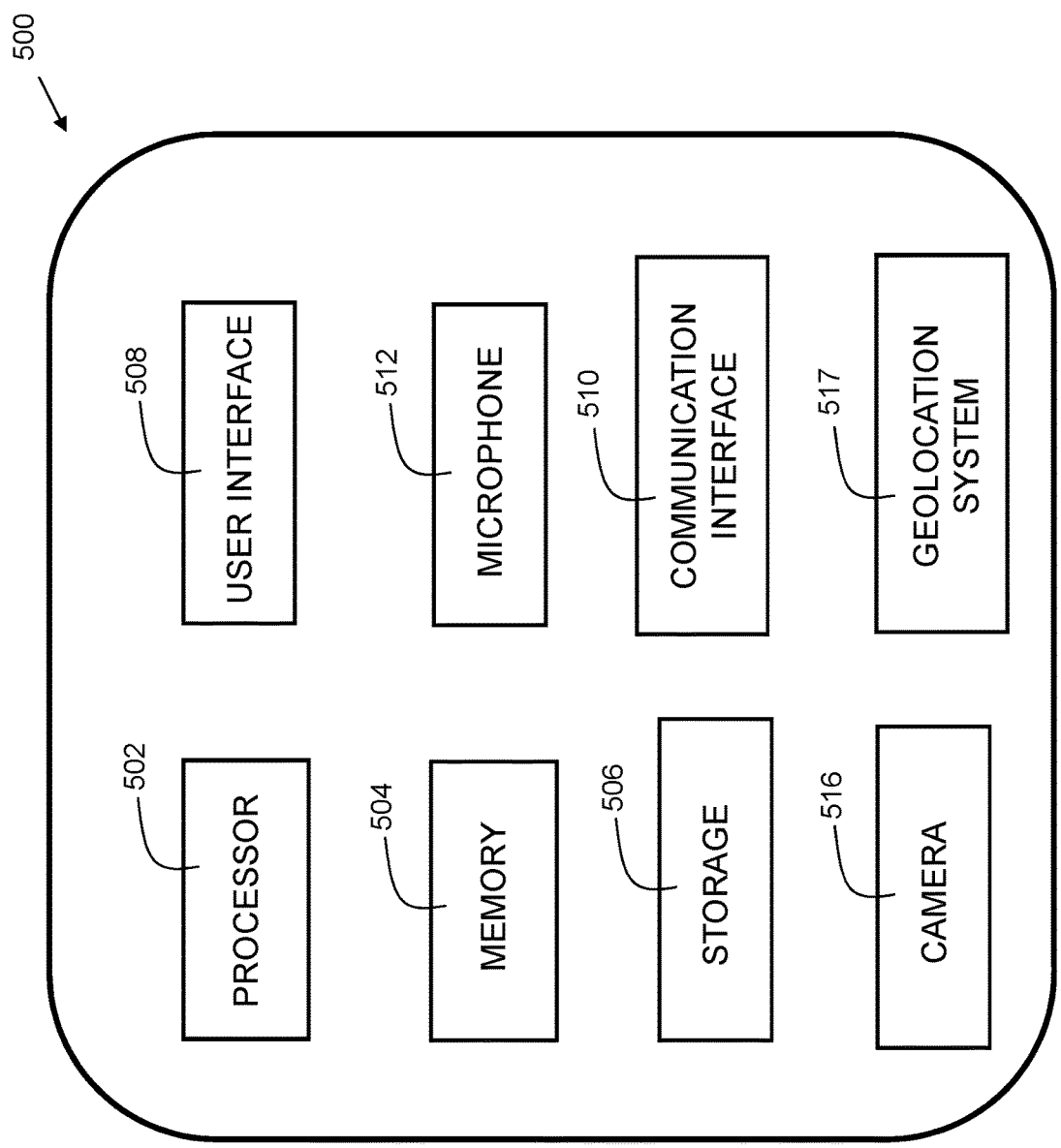
FIG. 5 is a block diagram of a mobile edge computing device.

FIG. 5 is a block diagram of a mobile edge computing device 500 in accordance with embodiments of the present invention. This represents a mobile device that participates in an edge computing network such as devices 171-175 of FIG. 1. Device 500 includes a processor 502, which is coupled to a memory 504. Memory 504 may include dynamic random-access memory (DRAM), static random-access memory (SRAM), magnetic storage, and/or a read only memory such as flash, EEPROM, optical storage, or other suitable memory. In some embodiments, the memory 504 may not be a transitory signal per se.

Device 500 may further include storage 506. In embodiments, storage 506 may include one or more magnetic storage devices such as hard disk drives (HDDs). Storage 506 may additionally include one or more solid state drives (SSDs).

Device 500 may, in some embodiments, include a user interface 508. This may include a display, keyboard, or other suitable interface. In some embodiments, the display may be touch-sensitive.

The device 500 further includes a communication interface 510. The communication interface 510 may include a wireless communication interface that includes modulators, demodulators, and antennas for a variety of wireless protocols including, but not limited to, Bluetooth™, Wi-Fi, and/or cellular communication protocols for communication over a computer network. In embodiments, instructions are stored in memory 504. The instructions, when executed by the processor 502, cause the electronic computing device 500 to execute operations in accordance with embodiments of the present invention.

Device 500 may further include a microphone 512 used to receive audio input. The audio input may include speech utterances such as 175u of FIG. 2B. The audio input may be digitized by circuitry within the device 500. The digitized audio data may be analyzed for phonemes and converted to text for further natural language processing. In some embodiments, the natural language processing may be performed onboard the device 500. In other embodiments, all or some of the natural language processing may be performed on a remote computer.

Device 500 may further include camera 516. In embodiments, camera 516 may be used to acquire still images and/or video images by device 500.

Device 500 may further include geolocation system 517. In embodiments, geolocation system 517 includes a Global Positioning System (GPS), GLONASS, Galileo, or other suitable satellite navigation system. The geolocation system 517 may obtain location coordinates such as shown at 181 of FIG. 2A. The location coordinates may be transmitted from the device 500 to a LEPS to inform the LEPS of the position of the device 500. The LEPS, as part of an initial setup may have location coordinates programmed into its storage (144). The LEPS can then determine the distance between the LEPS and the device 500 to determine if the device 500 is currently in the vicinity of the LEPS.

Figure 6:
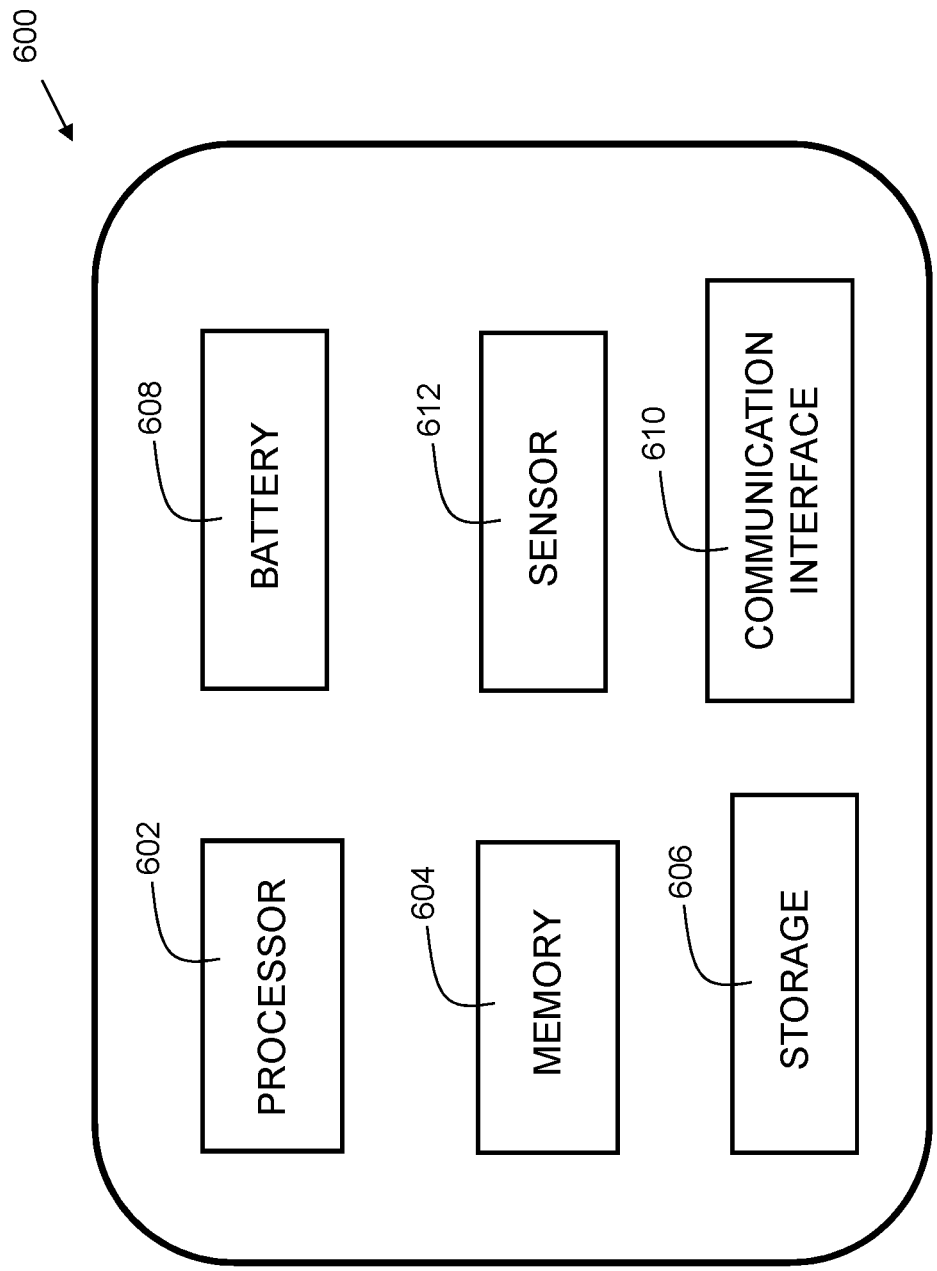
FIG. 6 is a block diagram of an IoT sensor device.

FIG. 6 is a block diagram of an IoT sensor device 600. This represents an IoT sensor device that participates in an edge computing network such as devices 161-166 of FIG. 1. IoT sensor device 600 includes a processor 602, which is coupled to a memory 604. Memory 604 may include dynamic random-access memory (DRAM), static random-access memory (SRAM), magnetic storage, and/or a read only memory such as flash, EEPROM, optical storage, or other suitable memory. In some embodiments, the memory 604 may not be a transitory signal per se.

Device 600 may further include storage 606. In embodiments, storage 606 may include one or more magnetic storage devices such as hard disk drives (HDDs). Storage 606 may additionally include one or more solid state drives (SSDs).

Device 600 may include a battery 608, or other suitable power source for powering the IoT device 600. The device 600 further includes a communication interface 610. The communication interface 610 may include a wireless communication interface that includes modulators, demodulators, and antennas for a variety of wireless protocols including, but not limited to, Bluetooth™, Bluetooth Low Energy (BLE), Zigbee, Wi-Fi, and/or cellular communication protocols for communication over a computer network. In embodiments, instructions are stored in memory 604. The instructions, when executed by the processor 602, cause the device 600 to execute operations in accordance with embodiments of the present invention.

Device 600 includes a sensor 612. In some embodiments, device 600 may include multiple sensors. The sensors can include a variety of types of sensors and can be used for a variety of applications. The sensor 612 may include, but is not limited to, a temperature sensor, pressure sensor, vibration sensor, motion sensor, light sensor, water sensor, precipitation sensor, wind sensor, noise sensor, infrared light sensor, camera, or other suitable sensor. The device 600 generates raw data from sensor 612 that is transmitted to a LEPS. With the advent of low-cost, low-power IoT sensor devices, it is possible to have many such sensors distributed around an area. This can create large amounts of data. Since people often carry mobile phones or tablets, which have evolved in into powerful computing devices, there is often available computing resources that can be harnessed to process the large amounts of data coming from these IoT sensor devices. Disclosed embodiments improve the technical field of mobile edge computing by enabling the LEPS to make improved decisions about which mobile devices are selected to participate in an edge computing network.

Figure 7:
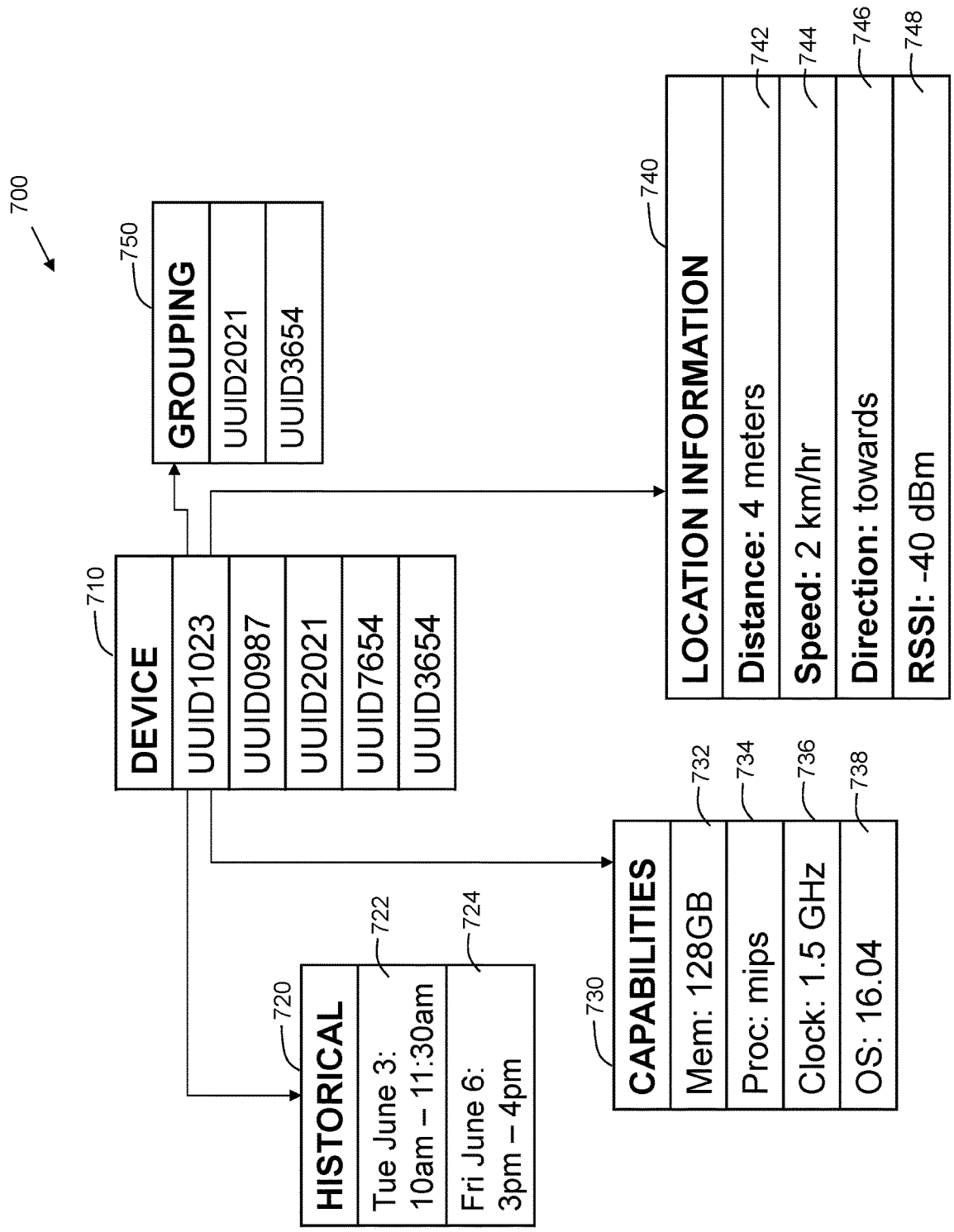
FIG. 7 shows exemplary data structures in accordance with embodiments of the present invention.

FIG. 7 shows a diagram 700 of exemplary data structures in accordance with embodiments of the present invention. In embodiments, these data structures may be stored in a database within the LEPS. The database may be a relational database, such as an SQL (structured query language) database. Table 710 includes records of unique identifiers corresponding to mobile devices that the LEPS has detected. The unique identifier can be based on a MAC address of the mobile device, serial number of the mobile device, or other suitable identifier. For each entry in device table 710, there is a historical table 720. The historical table 720 has entries indicating previous times and durations that the particular mobile device was detected by the LEPS. In the example shown, the device with unique identifier UUID1023 has a historical table 720 with two entries. Entry 722 indicates that the mobile device with unique identifier UUID1023 has been detected on Tuesday June 3 from 10:00 am to 11:30 am, and on Friday June 6 from 3:00 pm to 4:00 pm. In embodiments, the LEPS checks the historical table 720 to check for reoccurring patterns such as daily, weekly, or monthly patterns to determine if there is a historical trend pertaining to a length of stay within a vicinity for a particular mobile device. Thus, in embodiments, computing the estimated likelihood that the mobile device will remain within a predetermined distance of a local edge process server of an edge computing network for a duration exceeding a job time is based on a historical record of activity of the mobile device.

For each entry in device table 710, there is a capabilities table 730. The capabilities table 730 has entries indicating hardware and/or software capabilities for the mobile device. In the example shown, the device with unique identifier UUID1023 has a capabilities table 730 with four entries. In embodiments, performing an evaluation of available resources of each mobile device of the plurality of mobile devices includes obtaining an amount of available memory on the mobile device. Entry 732 indicates that the mobile device has 128 GB of memory. In embodiments, performing an evaluation of available resources of each mobile device of the plurality of mobile devices includes obtaining a processor type for the mobile device. Entry 734 indicates that the mobile device has a mips processor. In embodiments, performing an evaluation of available resources of each mobile device of the plurality of mobile devices includes obtaining a processor speed for the mobile device. Entry 736 indicates that the device has a clock speed of 1.5 GHz. Entry 738 indicates that the device is using an operating system version 16.04. These capability entries are exemplary, and other embodiments can have more/fewer/different entries than those shown in FIG. 7.

For each entry in device table 710, there is a location information table 740. The location information table 740 has entries indicating the current location of a mobile device. In the example shown, the device with unique identifier UUID1023 has a location information table 740 having a distance entry 742, a speed entry 744, a direction entry 746, and a received signal strength indication (RSSI) entry 748. In embodiments, when a mobile device is out of range of the LEPS, the location information table 740 indicates an out-of-range condition. As shown in the example of FIG. 7, for the device with unique identifier UUID1023, and the distance in entry 742 is indicated as 4 meters, the speed in entry 744 is indicated as 2 km/hr. The direction indicated in entry 746 is indicated as towards, meaning that the mobile device with unique identifier UUID1023 is currently moving towards the LEPS. The combination of the information stored in entry 744 and entry 746 can be used to synthesize a directional vector for the mobile device. The RSSI entry 748 indicates a current received signal strength indication of −40 dBm. In some embodiments, location information table 740 may contain other entries, such as latitude, longitude, street address information, and/or other information used to infer location and/or direction of motion.

For each entry in device table 710, there is a grouping table 750. The grouping table 750 has entries indicating a grouping of a mobile device with other mobile devices. In a case where no grouping exists, table 750 may be empty (zero entries). In the example shown, the device with unique identifier UUID1023 has a grouping with the mobile device corresponding to unique identifier UUID2021 and unique identifier UUID3654. In embodiments, the LEPS checks the corresponding historical table for each mobile device it detects, and identifies cases where multiple entries amongst the historical tables of mobile devices are similar. In this example, the historical table for the mobile device corresponding to unique identifier UUID2021 indicates a number of entries that match that for the device with unique identifier UUID1023. Therefore, those mobile devices are included as part of a mobile device group (see 180 of FIG. 2C). Thus, in embodiments, computing the estimated likelihood that the mobile device will remain within a predetermined distance of a local edge process server of an edge computing network for a duration exceeding a job time is performed by: correlating the mobile device to a second mobile device to form a mobile device group; and applying an estimated likelihood that the second mobile device will remain within a predetermined distance of a local edge process server of an edge computing network for a duration exceeding a job time, to the mobile device.

The LEPS may utilize the information contained within the data tables shown in FIG. 7 to make estimates about the dwell time of a mobile device. That is, the LEPS may utilize the information the data tables shown in FIG. 7 to make estimates about how long the mobile device is likely to remain in the vicinity. This enables the LEPS to make better choices about which mobile devices participate in an edge computing network. Mobile devices that are not likely to remain in the vicinity long enough to complete a job are excluded from participation in the edge computing network, thereby avoiding the performance penalty associated with selection of such mobile devices.

Figure 8:
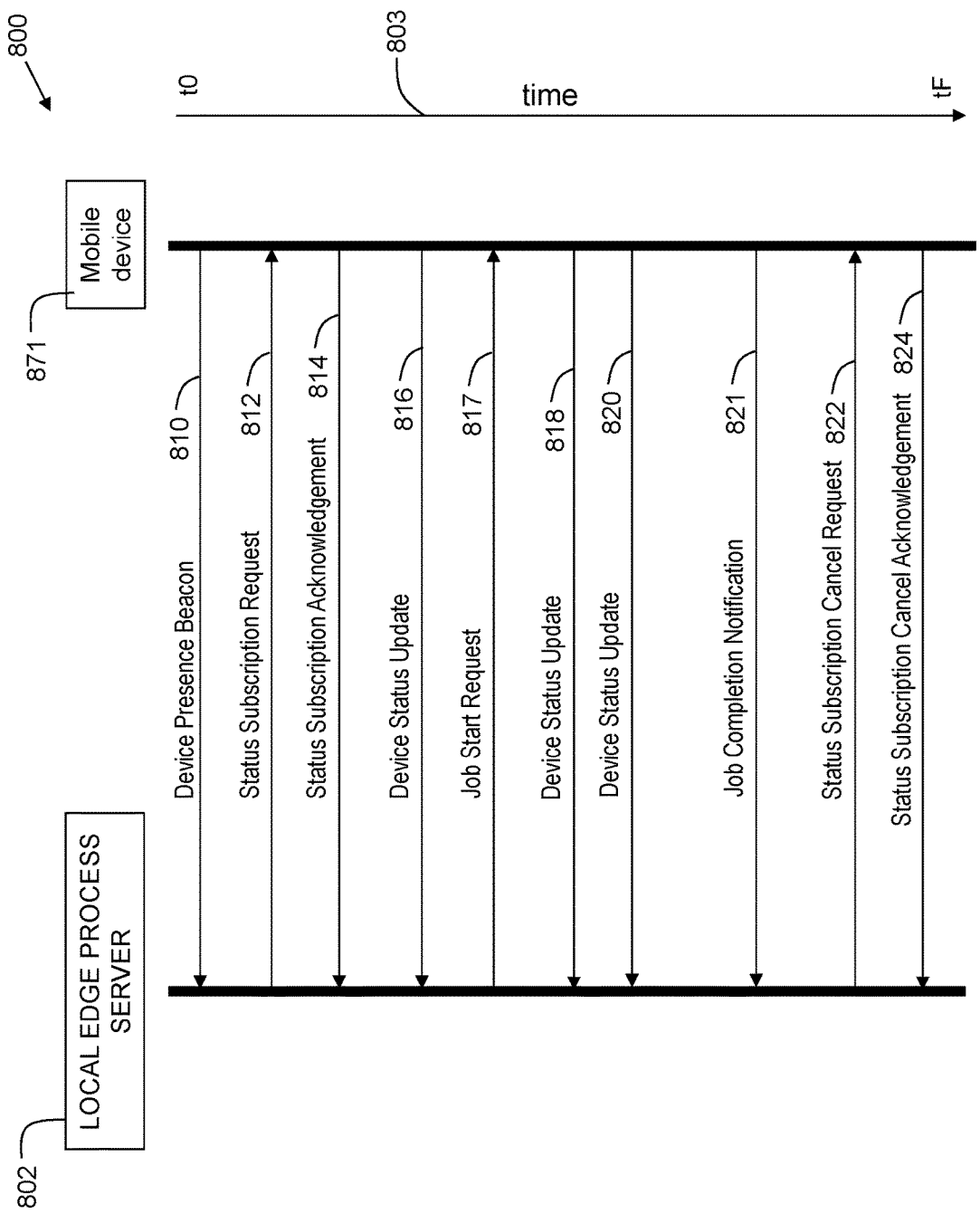
FIG. 8 shows an exemplary message flow between a local edge process server and a mobile edge computing device.

FIG. 8 shows an exemplary message flow 800 between a local edge process server 802 and a mobile edge computing device 871. Axis 803 represents time, starting from an initial time t0 to a final time tF. In embodiments, the detection of a mobile device in the vicinity may start with detection of a device presence beacon 810. The device presence beacon can be a signal or advertisement sent by the mobile device via Wi-Fi, or other suitable protocol. When this is received by the local edge process server (LEPS) 802, the LEPS then may send a Status Subscription Request 812. The Status Subscription Request notifies the mobile device 871 to report status updates to the LEPS. In response to the Status Subscription Request, the mobile device 871 may send a Status Subscription Acknowledgement 814 to the LEPS 802. With the subscription process complete, the mobile device 871 then sends a Device Status Update 816 to the LEPS 802. The Device Status Update may contain information shown in FIG. 7, such as position, speed, direction, capabilities, and/or other information that the LEPS may use for computing an eligibility score. In cases where the eligibility score indicates that the mobile device is eligible to participate in the edge computing network, the LEPS then sends a Job Start Request 817, which provides data and/or instructions for the mobile device 871 to begin a job. Periodically, the mobile device 871 may send device status updates, such as those indicated at 818 and 820. If the additional Device Status Update messages indicate that the mobile device may leave the vicinity before the job is completed, the job may be canceled. In the case where the additional Device Status Update messages indicate that the mobile device is likely remaining in the vicinity, no action is taken, and when the job completes, the mobile device 871 sends a Job Completion Notification 821. The Job Completion Notification includes a confirmation that the job has been completed, and may also contain the output results of the job. In some embodiments, the mobile device may send the output results of the job to a different computer than the LEPS for additional upstream processing. In such embodiments, the job time, as determined by the LEPS, may be based on the time required to transmit all the raw data required for the job to the mobile device. Once the job is complete, the LEPS 802 may send a Status Subscription Cancel Request 822, indicating that it is no longer using the mobile device 871 in the edge computing network. In response, the mobile device 871 sends a Status Subscription Cancel Acknowledgement 824 to conclude the process. Alternatively, after the Job Completion Notification 821 is received by the LEPS 802, the LEPS 802 may send another Job Start Request message to assign another job to the mobile device 871. This process may continue until the mobile device leaves the network or data from the Device Status Updates indicates that the mobile device has a probability above a predetermined threshold that it will leave the vicinity soon. The message exchanges depicted in message flow 800 are exemplary, and other embodiments may utilize additional and/or different messages for the exchange of information.

Figure 9:
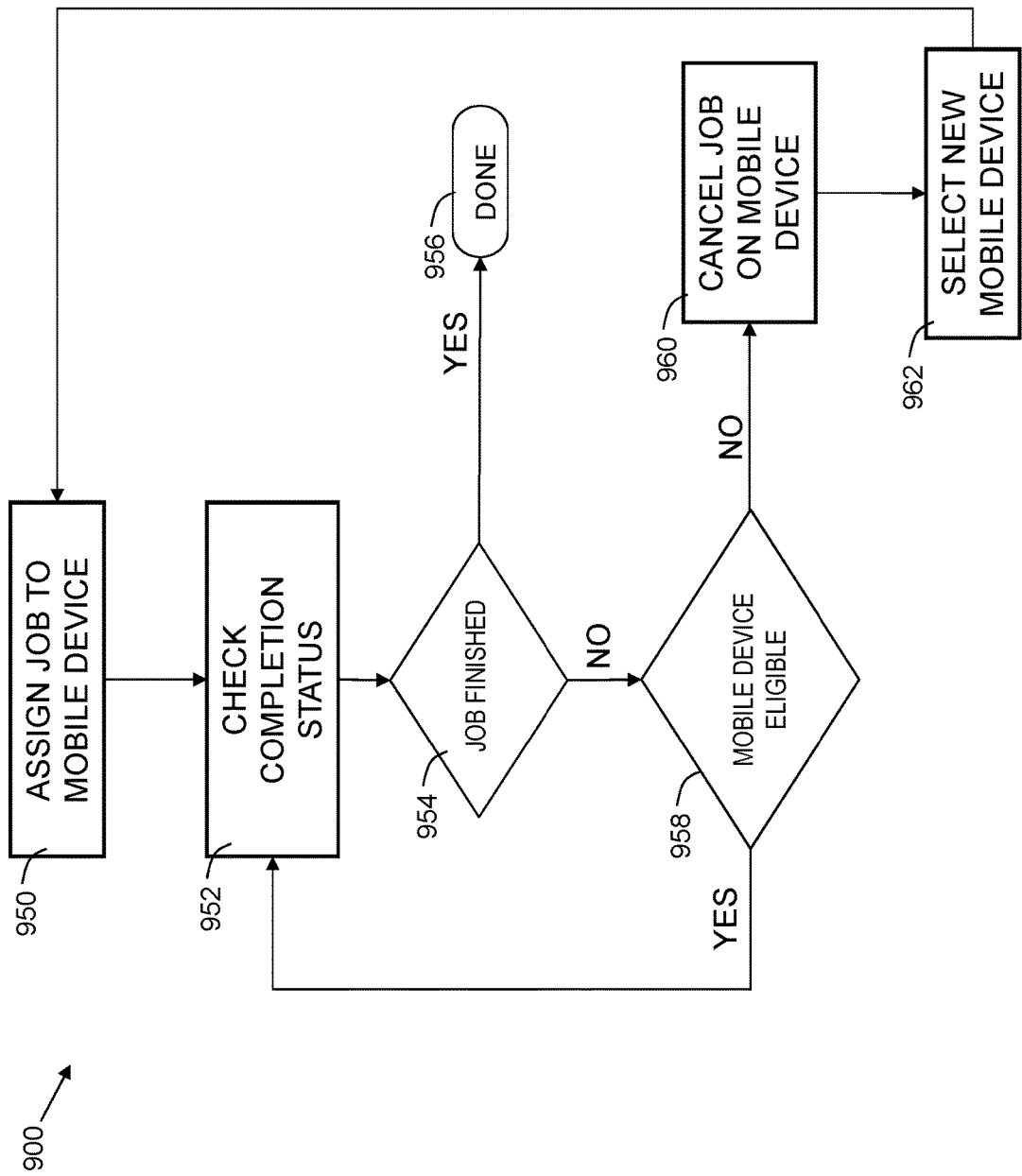
FIG. 9 is a flowchart indicating a monitoring sequence in accordance with embodiments of the present invention.

FIG. 9 is a flowchart 900 indicating a monitoring sequence in accordance with embodiments of the present invention. At 950, a job is assigned to a mobile device. As an example, the job may be to compute an average of multiple data points, a sorting of multiple data points, or other operation that produces an output result based on input raw data. At 952, a check of job completion is performed, such as if a Job Completion Notification 821 is received. If yes at 954, then the process concludes at 956. If no at 954, then at 958, a check is made to determine if the mobile device is still eligible. This check can include a variety of criteria. In embodiments, an estimated completion time of the job is computed and compared against an estimated dwell time of the mobile device. For example, initially a job may have a total completion time of 900 seconds, and the mobile device may have an estimated dwell time of 1,800 seconds, making the mobile device eligible. Then, 300 seconds later, the remaining completion time may be 600 seconds, and the estimated dwell time of the mobile device is reevaluated. If the estimated dwell time of the mobile device indicates that the mobile device has a probability above a predetermined threshold to remain in the vicinity long enough to complete the job, then the mobile device is still eligible, and the process returns to 952. If during that time, changes in the mobile device occur (e.g., an utterance such as 175*u* is detected) that cause the dwell time to be recomputed to a value that is less than the remaining completion time, then the mobile device is no longer eligible, and the job is canceled, as is shown at 960. Then, a new mobile device is selected at 962. and the process repeats until the job is completed. The flowchart sequence depicted by 960 and 962 represents a performance penalty that disclosed embodiments attempt to reduce by computing the eligibility score at 958. The decision at 958 is based on computing an eligibility score for each mobile device of the plurality of mobile devices based on an estimated likelihood that the mobile device will remain within a predetermined distance of a local edge process server of an edge computing network for a duration exceeding a job time, and selecting one or more mobile devices of the plurality of mobile devices for participation in the edge computing network based on their respective eligibility scores. More accuracy in the decision at 958 translates to better performance of the edge computing network.

As can now be appreciated, disclosed embodiments provide techniques for determining eligibility of a mobile device for participation in an edge computing network. Using positional information, movement, application activity, and/or historical information, disclosed embodiments compute an eligibility score that is indicative of if a mobile device is likely to remain in the vicinity long enough to process a job. By avoiding mobile devices that are unlikely to remain, the associated performance penalties of restarting an aborted job are reduced. Thus, disclosed embodiments improve the technical field of edge computing networks.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for determining mobile device edge computing participation eligibility, comprising:
    identifying a plurality of mobile devices for potential participation in an edge computing network;
    computing an eligibility score for each mobile device of the plurality of mobile devices based on an estimated likelihood that the mobile device will remain within a predetermined distance of a local edge process server of an edge computing network for a duration exceeding a job time; and
    selecting one or more mobile devices of the plurality of mobile devices for participation in the edge computing network based on their respective eligibility scores.

2. The computer-implemented method of claim 1, wherein computing an eligibility score for each mobile device of the plurality of mobile devices further includes performing an evaluation of available resources of each mobile device of the plurality of mobile devices.

3. The computer-implemented method of claim 1, further comprising computing the estimated likelihood that the mobile device will remain within a predetermined distance of a local edge process server of an edge computing network for a duration exceeding a job time based on a directional vector of the mobile device with respect to the local edge process server.

4. The computer-implemented method of claim 1, further comprising computing the estimated likelihood that the mobile device will remain within a predetermined distance of a local edge process server of an edge computing network for a duration exceeding a job time based on one or more calendar entries associated with the mobile device.

5. The computer-implemented method of claim 1, further comprising computing the estimated likelihood that the mobile device will remain within a predetermined distance of a local edge process server of an edge computing network for a duration exceeding a job time based on application activity associated with the mobile device.

6. The computer-implemented method of claim 5, further comprising computing the estimated likelihood that the mobile device will remain within a predetermined distance of a local edge process server of an edge computing network for a duration exceeding a job time based on rideshare application activity associated with the mobile device.

7. The computer-implemented method of claim 1, further comprising computing the estimated likelihood that the mobile device will remain within a predetermined distance of a local edge process server of an edge computing network for a duration exceeding a job time based on distance between the mobile device and the local edge process server.

8. The computer-implemented method of claim 1, further comprising computing the estimated likelihood that the mobile device will remain within a predetermined distance of a local edge process server of an edge computing network for a duration exceeding a job time based on a received signal strength indication of the mobile device.

9. The computer-implemented method of claim 1, further comprising computing the estimated likelihood that the mobile device will remain within a predetermined distance of a local edge process server of an edge computing network for a duration exceeding a job time based on a historical record of activity of the mobile device.

10. The computer-implemented method of claim 1, further comprising computing the estimated likelihood that the mobile device will remain within a predetermined distance of a local edge process server of an edge computing network for a duration exceeding a job time by:
    correlating the mobile device to a second mobile device to form a mobile device group; and
    applying an estimated likelihood that the second mobile device will remain within a predetermined distance of a local edge process server of an edge computing network for a duration exceeding a job time, to the mobile device.

11. The computer-implemented method of claim 1, further comprising computing the estimated likelihood that the mobile device will remain within a predetermined distance of a local edge process server of an edge computing network for a duration exceeding a job time based on a speech utterance received by the mobile device.

12. The computer-implemented method of claim 2, wherein performing an evaluation of available resources of each mobile device of the plurality of mobile devices includes obtaining an amount of available memory on the mobile device.

13. The computer-implemented method of claim 11, wherein performing an evaluation of available resources of each mobile device of the plurality of mobile devices includes obtaining a processor type for the mobile device.

14. The computer-implemented method of claim 12, wherein performing an evaluation of available resources of each mobile device of the plurality of mobile devices includes obtaining a processor speed for the mobile device.

15. An electronic computation device comprising:
a processor;
a memory coupled to the processor, the memory containing instructions, that when executed by the processor, cause the electronic computation device to:
identify a plurality of mobile devices for potential participation in an edge computing network;
compute an eligibility score for each mobile device of the plurality of mobile devices based on an estimated likelihood that the mobile device will remain within a predetermined distance of a local edge process server of an edge computing network for a duration exceeding a job time; and
select one or more mobile devices of the plurality of mobile devices for participation in the edge computing network based on their respective eligibility scores.

16. The electronic computation device of claim 15 wherein the memory further comprises instructions, that when executed by the processor, cause the electronic computation device to perform an evaluation of available resources of each mobile device of the plurality of mobile devices.

17. The electronic computation device of claim 15 wherein the memory further comprises instructions, that when executed by the processor, cause the electronic computation device to:
correlate the mobile device to a second mobile device to form a mobile device group; and
associate an estimated likelihood that the second mobile device will remain within a predetermined distance of a local edge process server of an edge computing network for a duration exceeding a job time, to the mobile device.

18. A computer program product for an electronic computation device comprising a computer readable storage medium having program instructions embodied therewith, the program instructions executable by a processor to cause the electronic computation device to:
identify a plurality of mobile devices for potential participation in an edge computing network;
compute an eligibility score for each mobile device of the plurality of mobile devices based on an estimated likelihood that the mobile device will remain within a predetermined distance of a local edge process server of an edge computing network for a duration exceeding a job time; and
select one or more mobile devices of the plurality of mobile devices for participation in the edge computing network based on their respective eligibility scores.

19. The computer program product of claim 18, wherein the computer readable storage medium includes program instructions executable by the processor to cause the electronic computation device to perform an evaluation of available resources of each mobile device of the plurality of mobile devices.

20. The computer program product of claim 18, wherein the computer readable storage medium includes program instructions executable by the processor to cause the electronic computation device to:
correlate the mobile device to a second mobile device to form a mobile device group; and
associate an estimated likelihood that the second mobile device will remain within a predetermined distance of a local edge process server of an edge computing network for a duration exceeding a job time, to the mobile device.

* * * * *